Patented July 18, 1933

1,918,895

UNITED STATES PATENT OFFICE

FREDERICK THOMAS BERSEY, ERNEST ARTHUR HARDY, AND SIDNEY CHARLES NEWSON, OF LONDON, ENGLAND

METALLIC LINING OF METAL BODIES

No Drawing. Application filed June 25, 1931, Serial No. 546,908, and in Great Britain February 7, 1931.

This invention relates to a method of lining metallic bodies by a metallic liner, and has in view to effect fixation of the lining within the body, such that the liner may be secured without resorting to loose or supplementary fixing means.

The invention is particularly suitable for linings for brake drums and forms a ready means whereby said drums may be lined or re-lined with a liner of exceptionally hard character.

Broadly, according to this invention, the method consists in providing a ring or strip of suitable steel of the required size to fit into the brake drum or other article to be lined, and subjecting the said steel liner to any known process whereby it is caused to "grow" or permanently expand. By so calculating the peripheral length of the lining and controlling the process, the growth is such as to cause the two elements to become, in effect, a unit.

In one mode of carrying out the invention, there is inserted into the metal body a lining strip of suitable steel, pre-cut to a dimension such that with the ends abutting, it is a close fit into the said body, and the expansion thereof, by the aforesaid process, will cause it to increase in diameter so as to cause it to be permanently fixed within the body.

In greater detail, considering the invention in its application to a brake drum, a strip of suitable steel is cut to a required width and to a length equal to the internal circumference of the drum, with the two ends juxtaposed. The drum is then submitted to a suitable process to cause the growth, when the two ends will bear on one another and the uniform expansion of the steel lining cause it to bind in the drum. The lining may, if desired, be keyed into the drum, such as by providing projections on the lining and recesses in the drum, or vice versa, or, if desired, the lining may be sunk into the surface of the drum for a convenient depth, but it is to be clearly understood that the fixing of the one element within the other alone will prevent any relative movement, and such auxiliary retention means would be merely as a safeguard, or to guide the lining into place. For the latter purpose, a conical projection may be provided extending, in a radial direction, internally of the casing, the widest part of said projection being at its extremity. If the ends of the lining, prior to carrying out the "growing" process are brought against the respective sides of such projections, suitable gaps being provided at such ends, then the growth of the lining will result in the ends thereof bearing against the inclined faces of the projections and, by their slight outward displacement therealong, becoming pressed firmly against the wall of the casing without fear of their abutting one another and the lining being expanded when said ends are improperly aligned. Correct lateral positioning is also thus ensured.

The process preferably employed consists in first inserting the steel liner as above mentioned, said liner not having been completely hardened, and covering the drum itself with sodium silicate, barium or potassium chloride, or other protective coating so as to prevent any action on said drum itself. The drum is then placed in a gas-tight box heated by a furnace, and subjected to the action of nitrogen present in said box to produce nitration of the steel. The nitrogen supply may be in the form of ammonia gas passed through or into the box, the latter being suitably constructed for this purpose, and the temperature raised to approximately 500 degrees centigrade. The nitration treatment is maintained at the desired temperature for a period up to 50 hours, depending upon the degree of hardness and growth desired.

As a result of nitration, the liner will be hardened and simultaneously caused to "grow" or permanently expand so that the result will be a lining of an extremely hard character immovably secured in the drum by reason of the growth.

The steel used for the lining intended for treatment by this nitrogenation process preferably is of a suitable composition to result in simultaneous growing and hardening, and, by way of example, may be a steel alloy containing carbon, silicon, manganese, nickel, chromium, aluminium, a suitable steel for use being that known in the trade under the name "Nitralloy".

The two ends of the steel lining may be welded, brazed, or otherwise joined together if so desired, but it is to be understood that the security of the lining in the brake drum or other body is due to the "growth" of said liner.

It is to be understood that instead of forming the lining from a strip of metal, an endless ring, stamped, pressed or otherwise preformed as a continuous member having the required peripheral dimensions so that upon treatment it will grow so as to become permanently fixed within the body, may be used.

We claim:—

The method of lining a brake drum which consists in positioning a lining element composed of an alloy of steel in said drum and subjecting said element to the action of nitrogen in the presence of heat to cause the same to "grow" and thus become tightly fitted in said drum.

FREDERICK THOMAS BERSEY.
ERNEST ARTHUR HARDY.
SIDNEY CHARLES NEWSON.